(12) United States Patent
Kutergin et al.

(10) Patent No.: US 10,530,677 B2
(45) Date of Patent: Jan. 7, 2020

(54) NAMESPACE ROUTING

(71) Applicant: Harmonic, Inc., San Jose, CA (US)

(72) Inventors: Dmytro Kutergin, San Jose, CA (US); Michael W. Patrick, Assonet, MA (US)

(73) Assignee: Harmonic, Inc., San Jose, CA (US)

( * ) Notice: Subject to any disclaimer, the term of this patent is extended or adjusted under 35 U.S.C. 154(b) by 269 days.

(21) Appl. No.: 15/644,789

(22) Filed: Jul. 9, 2017

(65) Prior Publication Data
US 2018/0013660 A1 Jan. 11, 2018

Related U.S. Application Data

(60) Provisional application No. 62/360,849, filed on Jul. 11, 2016.

(51) Int. Cl.
| | | |
|---|---|---|
| G06F 15/16 | (2006.01) | |
| H04L 12/715 | (2013.01) | |
| H04L 29/08 | (2006.01) | |
| H04L 12/771 | (2013.01) | |
| H04L 29/12 | (2006.01) | |

(52) U.S. Cl.
CPC .............. *H04L 45/04* (2013.01); *H04L 45/56* (2013.01); *H04L 61/1552* (2013.01); *H04L 61/30* (2013.01); *H04L 67/146* (2013.01)

(58) Field of Classification Search
CPC ..... H04L 45/04; H04L 45/56; H04L 61/1552; H04L 61/30; H04L 67/146; H04L 61/2007
USPC ......................................................... 709/228
See application file for complete search history.

(56) References Cited

U.S. PATENT DOCUMENTS

| | | | |
|---|---|---|---|
| 6,028,846 A * | 2/2000 | Cain ....................... | H04L 43/50 370/250 |
| 2003/0041141 A1* | 2/2003 | Abdelaziz ............. | G06F 9/4416 709/223 |
| 2010/0223625 A1* | 9/2010 | Smith .................... | G06F 1/3209 719/317 |
| 2013/0094376 A1* | 4/2013 | Reeves .................. | H04L 43/18 370/252 |

(Continued)

OTHER PUBLICATIONS

International Search Report and Written Opinion of the International Searching Authority issued in PCT/US17/41279 dated Sep. 22, 2017.

*Primary Examiner* — Atta Khan
(74) *Attorney, Agent, or Firm* — Brokaw Patent Law PC; Christopher J. Brokaw

(57) ABSTRACT

A network element employing multiple namespaces in performing IP packet routing. The network element maintaining two or more namespaces. A first namespace corresponds to an in-band network domain and a second namespace corresponds to an out-of-band network domain. The network element performing IP packet routing over the in-band network domain and the out-of-band network domain using said two or more namespaces. Embodiments allow operators to more easily implement separate routing tables for "in-band" and "out-of-band" communication. Having separate routing tables for in-band and out-of-band communication prevents malicious CPEs and hacked CMs from directly communicating to servers on the out-of-band network, thereby increasing security for CMTS operators.

15 Claims, 3 Drawing Sheets

(56) References Cited

U.S. PATENT DOCUMENTS

2013/0151661 A1 6/2013 Koponen et al.
2016/0127321 A1\* 5/2016 Fainkichen ........... H04W 76/10
　　　　　　　　　　　　　　　　　　　　　726/4

\* cited by examiner

NAMESPACE ROUTING

CLAIM OF PRIORITY

This application claims priority to U.S. provisional patent application Ser. No. 62/360,849, filed Jul. 11, 2016, entitled "Namespace Routing for Virtual CCAP," the contents of which are hereby incorporated by reference for all purposes as if fully set forth herein.

FIELD OF THE INVENTION

Embodiments of the invention relate to a network element employing multiple namespaces in performing IP packet routing.

BACKGROUND

Many different types of network elements receive and route IP packets over a network, such as without limitation a server, a router, and a Cable Modem Termination System (CMTS).

A network element may have both an "in-band domain" and an "out-of-band" domain, which are well-understood concepts in the art. An in-band domain refers to network traffic related to the primary purpose of the network element. For example, a router would route Internet traffic over an in-band domain. This is contrasted with an out-of-band domain, which refers to a communication channel used to manage or configure the network element.

Many network elements run the Linux operating system (Linux OS). When a network element runs the Linux OS and comprises both "in-band" and "out-of-band" network domains, the usual industry practice is to perform IP packet routing using a single "global" routing table that includes both in-band domain information and out-of-band domain information.

When a network element transmits an outgoing IP packet, the outgoing IP packet prepared by a software process on the network element is submitted to the Linux OS kernel. The Linux OS kernel selects the outgoing interface usually based on matching the outgoing IP packet's destination IP address with its longest prefix in a default route table.

However, simple destination-based routing will not work for Internet Service Providers (ISPs) that wish to implement separate networks for their in-band and out-of-band traffic. This is so because in-band and out-of-band networks may contain the same or overlapping IP subnets. Another problem preventing ISPs from using simple destination-based routing is that some of the destination IP subnets cannot be known in advance, which is commonly the case when a customer of the ISP wishes to access the Internet. To address these issues, two default routes (and essentially two routing tables) are required to be active on the network element at the same time. Having two routing tables on a network element active at the same time requires a mechanism to effectively select between them.

One approach currently used to select between routing tables on a network element is "policy based routing," or PBR, which is a routing policy that selects the routing table which should be used based on both the destination and the source IP address of the packet. However, a Linux OS process must use explicit socket "bind( )" calls to use PBR, which is not the case by default, and few Linux OS tools have such customization run-time option. As a result, PBR in many cases prevents the use of third-party binary software packages which use standard socket calls. Even with public domain software, all socket bind( ) calls must be reprogrammed to use policy based routing options, which even if technically feasible, is certainly time-consuming, costly, and labor intensive.

BRIEF DESCRIPTION OF THE DRAWINGS

Embodiments of the invention are illustrated by way of example, and not by way of limitation, in the figures of the accompanying drawings and in which like reference numerals refer to similar elements and in which.

DETAILED DESCRIPTION OF THE INVENTION

Approaches for a network element that employs multiple namespaces in the performance of IP packet routing are presented herein. In the following description, for the purposes of explanation, numerous specific details are set forth in order to provide a thorough understanding of the embodiments of the invention described herein. It will be apparent, however, that the embodiments of the invention described herein may be practiced without these specific details. In other instances, well-known structures and devices are shown in block diagram form or discussed at a high level in order to avoid unnecessarily obscuring teachings of embodiments of the invention.

Embodiments of the invention provide for the use of Linux "namespaces" to properly route "in-band" and 'out-of-band" IP packets in data forwarding network elements without the use of policy-based-routing.

Embodiments of the invention are directed towards a network element that employs multiple namespaces in the performance of IP packet routing. A network element of an embodiment maintains at least two separate network domains for their operation. One such network domain is the main data path domain (so called "in-band" domain), that actually serves the main purpose of the system. For example, in a Cable Modem Termination System (CMTS), the in-band domain provides Internet access and Video content to the customers by processing users' traffic in a special manner.

Another network domain is management domain (so called "out-of-band" domain), that serves the purpose of providing maintenance, configuration and debugging capabilities. For example, in a CMTS, the out-of-band domain enables debugging of the system if the main "in-band" network domain is experiencing operational problems. The out-of-band domain also provides the means of configuring basic infrastructure operation, such as configuring IP addresses, routes, hostnames, and the like. Another application of the "out-of-band" domain is monitoring operational parameters of the system, e.g. via SNMP or directly by using operating system (OS) tools.

An "out-of-band" Ethernet port is connected to a separate management network in such a way that it should not interfere with "in-band" network domain due to security, ISP provisioning, and data network topology. The usual industry mechanism for forwarding Linux process traffic on the in-band or out-of-band network is via IP routing, either the usual destination-based routing or source-based policy routing (PBR). However, current approaches suffer from several disadvantages, particular for Internet Service Providers (ISPs).

Advantageously, embodiments of the invention enable the use of separate Linux network namespaces for in-band and out-of-band traffic inside a network element, one example of which being a Cable Modem Termination System (CMTS), thereby allowing the usage of third party software with standard socket calls and avoids reprogramming of open source software with standard socket calls.

Figure 1:
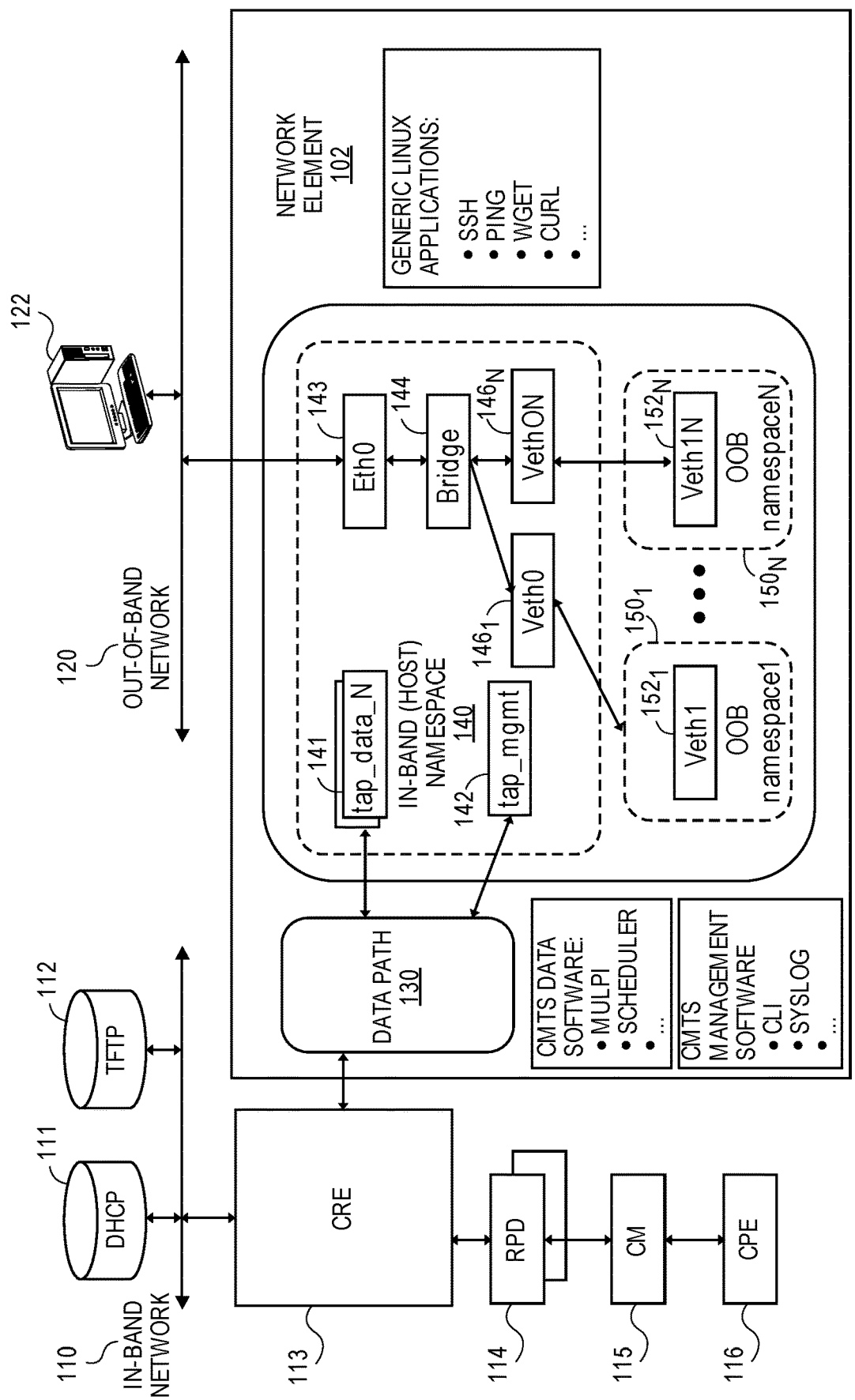
FIG. 1 is a block diagram of a system for a network element employing multiple namespaces in IP Packet routing according to an embodiment of the invention.

FIG. 1 is a block diagram of a system 100 for a network element 102 employing multiple namespaces in IP Packet routing according to an embodiment of the invention.

Network element 102, as broadly used herein, refers to any network device having both an in-band network domain 110 and an out-of-band network domain 120. Non-limiting, illustrative examples of network element 102 include a server, a router, and a Cable Modem Termination System (CMTS). In an embodiment, network element 102 may be implemented using off-the-shelf computer system(s) that run the Linux operating system. A particular example of such a network element 102 is a device executing the software-based Converged Cable Access Platform (CCAP) family of products, including for example CableOS, available from Harmonic, Inc. of San Jose, Calif. In one embodiment, network element 102 may serve a CMTS role in a telecommunication companies' head-end data-center. In other embodiments, network element 102 may serve other roles or be positioned elsewhere within a network.

In-band network domain 110, as broadly used herein, refers to an in-band network domain of network element 102. As network element 102 may be embodied in a wide variety of devices, so too can in-band network domain 110 vary in structure across embodiments. In the example of FIG. 1, in-band network domain 110 comprises Core Routing Engine (CRE) 113. CRE 113 may communicate with network element 102 and one or more Remote PHY Devices (RPDs) 114. Remote PHY Devices (RPDs) 114 communicate cable modems 115, which in turn communicate with Customer Premise Equipment 116. CRE 113 also communicates over in-band network domain 110 with Dynamic Host Configuration Protocol (DHCP) 111 and Trivial File Transfer Protocol (TFTP) 112.

An operator or administrator of network element 102 may use a variety of devices, such as workstation 122, to manage, configure, and debug operations on network element 102 over out-of-band network domain 120.

Figure 2:
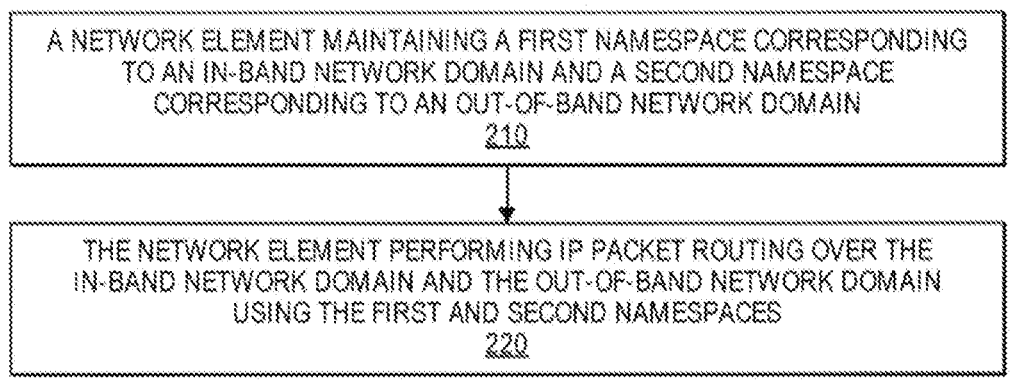
FIG. 2 is a flowchart illustrating the functional steps of a network element using multiple namespaces in IP Packet routing according to an embodiment of the invention.

FIG. 2 is a flowchart illustrating the functional steps of a network element using multiple namespaces in IP Packet routing according to an embodiment of the invention. In step 210, in an embodiment of the invention, separate Linux network namespaces are created on network element 102 for "in-band" forwarding and "out-of-band" forwarding, depicted as in-band (host) namespace 140 and OOB namespace $150_1$ to $150_N$, respectively. In embodiments, in-band (host) namespace 140 is the default network namespace in Linux OS. Note that FIG. 1 depicts multiple OOB namespaces for explanation purposes only, embodiments of the invention may include one or more OOB namespace 150, and thus, in certain embodiments there may only be a single OOB namespace 150. FIG. 1 depicts multiple OOB namespaces $150_{1\ to\ N}$ to illustrate that if required, embodiments may scale the number of separate OOB namespace 150 to support any number of separate network domains.

Each of in-band (host) namespace 140 and OOB namespaces $150_{1\ to\ N}$ may be implemented using a Linux network namespace, which is a kernel container that identifies a set of Linux kernel interfaces and a separate routing table. Each Linux OS process may be associated with a different network namespace. This allows a Linux OS process to use standard socket calls with destination-based routing with a different routing table than other processes, and the selection between the routing tables is made upon process start-up.

As described in further detail below, network element 102 may perform IP packet routing over in-band network domain 110 and out-of-band network domain 120 using in-band (host) namespace 140 and OOB namespaces $150_{1\ to\ N}$, as depicted by step 220 of FIG. 2.

By default, all Linux OS processes are assigned to use in-band (host) namespace 140. In an embodiment, a number of virtual Linux kernel interfaces, such as tap_data_n interface 141 and tap_mgmt interface 142, are defined within in-band (host) namespace 140 for communication with Data Path process 130, and by extension via Data Path process 130, to in-band network 110. Data Path process 130 is primarily responsible for the normal data forwarding functions of the network element, i.e. forwarding in-band data between network interfaces. Data Path process 130 may be implemented by, or correspond to one or more software processes responsible for exchanging communications between in-band network 110 and in-band (host) namespace 140.

In an embodiment, tap_mgmt interface 142 may perform services related to in-band management of network element 102 through CLI, monitoring through SNMP, and provisioning (for user account management, for example). The default Linux Secure Shell (SSH) process may listen for the in-band shell sessions on tap_mgmt interface 142.

SSH sessions to the Linux OS via an out-of-band interface are also supported by embodiments by launching additional SSH processes, each within its individual namespace, i.e., within one of OOB namespace $150_{1\ to\ N}$. A Linux OS virtual Ethernet interface veth1 $152_{1\ to\ N}$ (where N=1 ... N, N being the number of separate out-of-band namespaces needed) is created in each OOB namespace 150 that sends and receives packets to the particular Ethernet interface Eth0 143 designated for out-of-band operation.

Each of veth1 $152_{1\ to\ N}$ interface holds an externally visible IP address within out-of-band network 120. One or more Linux virtual Ethernet interfaces named veth0 $146_{1\ to\ N}$ are created in in-band (host) namespace 140 as the counterpart of the veth1 $152_{1\ to\ N}$. Virtual Ethernet interfaces are always created in pairs in Linux, as the two interfaces represent both ends of the "pipe" or communication channel. In order to establish a link between Eth0 interface 143 and veth0 $146_N$, bridge instance 144 is being employed. Note that in FIG. 1 there is only one Eth0 interface 143 that connects to OOB network 120, and so there is only one bridge instance 144 that joins all N interfaces veth0 $146_{1\ to\ N}$ to the single Eth0 interface 143, thus letting veth0 $146_{1\ to\ N}$ interfaces share the same physical interface, namely Eth0 interface 143.

In other embodiments (not depicted in FIG. 1), several physical interfaces Eth0 $143_{1\ to\ N}$ may each have their own bridge 144 and veth0 $146_{1\ to\ N}$-veth1 $152_{1\ to\ N}$ pair. Such an embodiment may be useful when physical interface sharing and namespaces cross-talk is not desired.

All necessary actions to create the infrastructure given above should be performed automatically upon booting network element 102. This infrastructure may be created upon boot using a startup script of Linux which describes all necessary commands to create veth0 $146_{1\ to\ N}$/veth1 $152_{1\ to\ N}$ pairs and bridge 144, to create namespaces and assign interfaces to them, to assign correct IP addresses to the veth1 $152_{1\ to\ N}$ either statically or through DHCP, and to launch dedicated SSH processes per new namespace, for example. A Linux startup script of an embodiment may comprise link detection logic to create this infrastructure along with the namespaces only when an OOB link is present.

SSH sessions are established in in-band (host) namespace 140 as usual in Linux when a user is connecting to network element 102 through tap_mgmt interface 142. On the other hand, when the user connects to network element 102 through an out-of-band IP address (which may be performed by connecting to network element 102 through veth$1_{1521\ to\ N}$), private SSH process executing in that OOB namespace $150_{1\ to\ N}$ serves this connection. Since the connection is supported by a particular OOB namespace $150_{1\ to\ N}$, only those components within that particular OOB namespace $150_{1\ to\ N}$ are, by default, visible to the user over this connection, which would only be particular veth1 152 interface and a linux "loopback" ("l0") interface."

Information that is in-band (host) namespace 140 is more useful than information in an OOB namespace 152 for debugging and monitoring purposes, and so a namespace switch from the OOB namespace 152 to in-band (host) namespace 140 happens upon successful login. This may done by an embodiment by launching a local SSH session to the default SSH process in the in-band (host) namespace 140 that provides not only network interfaces and routing table switch but also permits changing the network configuration. An example of changing the network configuration is, when a network namespace switch happens, to switch from using the configuration in the folder located at "/etc/network/to using the configuration in the folder/etc/netns/<NS_name/.

In order to decide whether the switch to in-band (host) namespace 140 by means of a SSH session is needed for a particular user, a script may be implemented inside the Linux user profile script for that user. As a result, the user experience inside this new SSH session is the same as if the user was connected to in-band (host) namespace 140 with one difference—the user cannot access OOB network addresses from inside in-band (host) namespace 140. To do so, the user must temporarily, on a per application basis, switch to the OOB namespace 150 and execute the command aimed to the OOB network 120 and after the command succeeds to immediately go back to in-band (host) namespace 140. In an embodiment, this objective may be performed by the use of Linux command "nsenter", and to use it more conveniently the simple alias, for example named "prefix":

An innovation of an embodiment is a Linux alias named "prefix" that causes the shell to start a command process inside OOB namespaces 150 instead and return back to the in-band (host) namespace 140 immediately after the command finishes. A non-limiting, illustrative example is:

alias prefix='sudo ip netns exec OOB-NS'

Thus, even when connecting via SSH on in-band (host) namespace 140, a Linux operator may run Linux "ping" or "scp" commands using an out-of-band routing table using the command syntax "prefix ping" or "prefix scp". With such simple command line additions, the task of deciding which routing table to use (i.e., what namespace to use) is addressed without the requirement of using or maintain any PBR or IP tables rules.

Embodiments use of namespaces and the ease of a prefix alias avoid having to write custom versions of commands to allow routing table selection thus provide value and benefit over the usual industry practice to have command arguments to bind to the specific source IP, e.g. "ping . . . -I<IP>". Furthermore, the use of a prefix to select the Linux namespace is compatible with all future Linux commands without having to develop or modify the software to be compatible with future Linux commands.

By significantly reducing the effort required to use different namespaces, embodiments of the invention make it easier for operators to implement separate routing tables for "in-band" and "out-of-band" communication. Having separate routing tables for in-band and out-of-band prevents malicious CPEs and hacked CMs from directly communicating to servers on the out-of-band network, thereby increasing security for CMTS operators.

Figure 3:
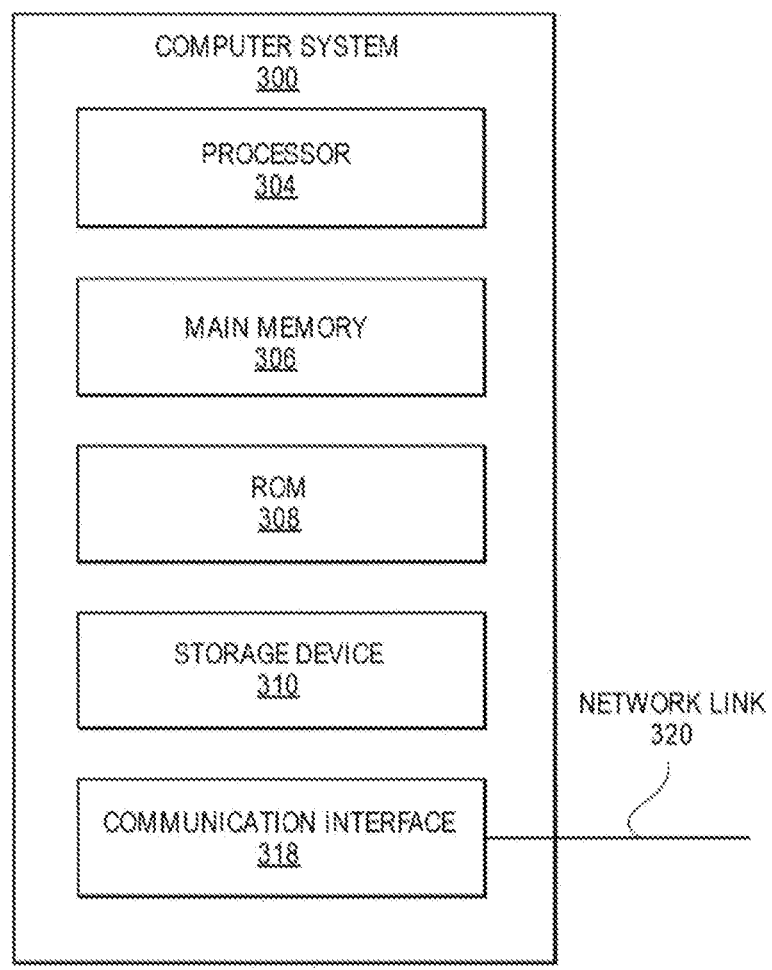
FIG. 3 is a block diagram that illustrates a computer system upon which an embodiment of the invention may be implemented.

In an embodiment, network element 102 depicted in FIG. 1 may be implemented by one or more computer systems. FIG. 3 is a block diagram that illustrates a computer system 300 upon which an embodiment of the invention may be implemented. In an embodiment, computer system 300 includes processor 304, main memory 306, ROM 308, storage device 310, and communication interface 318. Computer system 300 includes at least one processor 304 for processing information. Computer system 300 also includes a main memory 306, such as a random access memory (RAM) or other dynamic storage device, for storing information and instructions to be executed by processor 304. Main memory 306 also may be used for storing temporary variables or other intermediate information during execution of instructions to be executed by processor 304. Computer system 300 further includes a read only memory (ROM) 308 or other static storage device for storing static information and instructions for processor 304. A storage device 310, such as a magnetic disk or optical disk, is provided for storing information and instructions.

Embodiments of the invention are related to the use of computer system 300 for implementing the techniques described herein. According to one embodiment of the invention, those techniques are performed by computer system 300 in response to processor 304 executing one or more sequences of one or more instructions contained in main memory 306. Such instructions may be read into main memory 306 from another machine-readable medium, such as storage device 310. Execution of the sequences of instructions contained in main memory 306 causes processor 304 to perform the process steps described herein. In alternative embodiments, hard-wired circuitry may be used in place of or in combination with software instructions to implement embodiments of the invention. Thus, embodiments of the invention are not limited to any specific combination of hardware circuitry and software.

The term "non-transitory machine-readable storage medium" as used herein refers to any tangible medium that participates in storing instructions which may be provided to processor 304 for execution. Non-limiting, illustrative examples of non-transitory machine-readable media include, for example, a floppy disk, a flexible disk, hard disk, magnetic tape, or any other magnetic medium, a CD-ROM, any other optical medium, a RAM, a PROM, and EPROM, a FLASH-EPROM, any other memory chip or cartridge, or any other medium from which a computer can read.

Various forms of non-transitory machine readable media may be involved in carrying one or more sequences of one or more instructions to processor 304 for execution. For example, the instructions may initially be carried on a magnetic disk of a remote computer. The remote computer can load the instructions into its dynamic memory and send the instructions over a network link 320 to computer system 300.

Communication interface 318 provides a two-way data communication coupling to a network link 320 that is connected to a local network. For example, communication interface 318 may be an integrated services digital network (ISDN) card or a modem to provide a data communication connection to a corresponding type of telephone line. As another example, communication interface 318 may be a local area network (LAN) card to provide a data communication connection to a compatible LAN. Wireless links may also be implemented. In any such implementation, communication interface 318 sends and receives electrical, electromagnetic or optical signals that carry digital data streams representing various types of information.

Network link 320 typically provides data communication through one or more networks to other data devices. For example, network link 320 may provide a connection through a local network to a host computer or to data equipment operated by an Internet Service Provider (ISP).

Computer system 300 can send messages and receive data, including program code, through the network(s), network link 320 and communication interface 318. For example, a server might transmit a requested code for an application program through the Internet, a local ISP, a local network, subsequently to communication interface 318. The received code may be executed by processor 304 as it is received, and/or stored in storage device 310, or other non-volatile storage for later execution.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A non-transitory computer-readable storage medium that stores one or more sequences of instructions for IP packet routing at a network element, which when executed, cause:
the network element maintaining two or more namespaces, wherein each of said two or more namespaces maintained by the network element has a separate routing table maintained by the network element, wherein a first namespace of the two or more namespaces corresponds to an in-band network domain for providing Internet access and video content to subscriber devices, and wherein a second namespace of the two or more namespaces corresponds to an out-of-band network domain for network traffic related to managing or configuring the network element,
wherein the network element is a Cable Modem Termination System (CMTS); and
the network element performing IP packet routing over the in-band network domain and the out-of-band network domain using said two or more namespaces, wherein the network element performs IP packet routing over the in-band network domain and the out-of-band network domain without performing policy based routing (PBR).

2. The non-transitory computer-readable storage medium of claim 1, wherein said first namespace provides a Linux operating system alias to enable an operator to execute Linux commands against a routing table maintained by said second namespace.

3. The non-transitory computer-readable storage medium of claim 1, wherein execution of the one or more sequences of instructions further cause:
when a particular user connects to the network element via a SSH session established with an IP address associated with the out-of-band network domain, the network element executing a Linux user profile script associated with the particular user to ascertain whether a set of routing tables associated with said first namespace should be made accessible to the SSH session for the particular user.

4. The non-transitory computer-readable storage medium of claim 1, wherein each of said two or more namespaces are a Linux kernel container that identifies a set of Linux kernel interfaces.

5. The non-transitory computer-readable storage medium of claim 1, wherein said first and second namespaces communicate with each other using virtual Ethernet interfaces created using the Linux operating system.

6. A network element for IP packet routing, comprising:
one or more processors; and
one or more non-transitory computer-readable storage mediums storing one or more sequences of instructions, which when executed, cause:
the network element maintaining two or more namespaces, wherein each of said two or more namespaces maintained by the network element has a separate routing table maintained by the network element, wherein a first namespace of the two or more namespaces corresponds to an in-band network domain for providing Internet access and video content to subscriber devices, and wherein a second namespace of the two or more namespaces corresponds to an out-of-band network domain for network traffic related to managing or configuring the network element,
wherein the network element is a Cable Modem Termination System (CMTS); and
the network element performing IP packet routing over the in-band network domain and the out-of-band network domain using said two or more namespaces, wherein the network element performs IP packet routing over the in-band network domain and the out-of-band network domain without performing policy based routing (PBR).

7. The network element of claim 6, wherein said first namespace provides a Linux operating system alias to enable an operator to execute Linux commands against a routing table maintained by said second namespace.

8. The network element of claim 6, wherein execution of the one or more sequences of instructions further cause:
when a particular user connects to the network element via a SSH session established with an IP address associated with the out-of-band network domain, the network element executing a Linux user profile script associated with the particular user to ascertain whether a set of routing tables associated with said first namespace should be made accessible to the SSH session for the particular user.

9. The network element of claim 6, wherein each of said two or more namespaces are a Linux kernel container that identifies a set of Linux kernel interfaces.

10. The network element of claim 6, wherein said first and second namespaces communicate with each other using virtual Ethernet interfaces created using the Linux operating system.

11. A method for IP packet routing at a network element, comprising:

the network element maintaining two or more namespaces, wherein each of said two or more namespaces maintained by the network element has a separate routing table maintained by the network element, wherein a first namespace of the two or more namespaces corresponds to an in-band network domain for providing Internet access and video content to subscriber devices, and wherein a second namespace of the two or more namespaces corresponds to an out-of-band network domain for network traffic related to managing or configuring the network element, wherein the network element is a Cable Modem Termination System (CMTS); and the network element performing IP packet routing over the in-band network domain and the out-of-band network domain using said two or more namespaces, wherein the network element performs IP packet routing over the in-band network domain and the out-of-band network domain without performing policy based routing (PBR).

12. The method of claim 11, wherein said first namespace provides a Linux operating system alias to enable an operator to execute Linux commands against a routing table maintained by said second namespace.

13. The method of claim 11, wherein execution of the one or more sequences of instructions further cause:

when a particular user connects to the network element via a SSH session established with an IP address associated with the out-of-band network domain, the network element executing a Linux user profile script associated with the particular user to ascertain whether a set of routing tables associated with said first namespace should be made accessible to the SSH session for the particular user.

14. The method of claim 11, wherein each of said two or more namespaces are a Linux kernel container that identifies a set of Linux kernel interfaces.

15. The method of claim 11, wherein said first and second namespaces communicate with each other using virtual Ethernet interfaces created using the Linux operating system.

* * * * *